(12) United States Patent
Lomasney (10) Patent No.: US 11,851,781 B2
(45) Date of Patent: *Dec. 26, 2023

(54) METHOD AND APPARATUS FOR CONTINUOUSLY APPLYING NANOLAMINATE METAL COATINGS

(71) Applicant: MODUMETAL, INC., Snohomish, WA (US)

(72) Inventor: Christina A. Lomasney, Seattle, WA (US)

(73) Assignee: MODUMETAL, INC., Snohomish, WA (US)

( * ) Notice: Subject to any disclaimer, the term of this patent is extended or adjusted under 35 U.S.C. 154(b) by 87 days.

This patent is subject to a terminal disclaimer.

(21) Appl. No.: 17/533,015

(22) Filed: Nov. 22, 2021

(65) Prior Publication Data

US 2022/0154357 A1 May 19, 2022

Related U.S. Application Data

(60) Continuation of application No. 16/909,939, filed on Jun. 23, 2020, now Pat. No. 11,180,864, which is a
(Continued)

(51) Int. Cl.
*C25D 5/20* (2006.01)
*C25D 7/06* (2006.01)
(Continued)

(52) U.S. Cl.
CPC .............. *C25D 5/20* (2013.01); *B82Y 40/00* (2013.01); *C25D 3/04* (2013.01); *C25D 3/12* (2013.01); *C25D 3/16* (2013.01); *C25D 3/20* (2013.01); *C25D 3/22* (2013.01); *C25D 3/30* (2013.01); *C25D 3/34* (2013.01); *C25D 3/38* (2013.01); *C25D 3/42* (2013.01); *C25D 3/44* (2013.01); *C25D 3/48* (2013.01); *C25D 3/54* (2013.01);
(Continued)

(58) Field of Classification Search
CPC ... C25D 5/10; C25D 5/12; C25D 5/14; C25D 5/16; C25D 5/18; C25D 21/12
See application file for complete search history.

(56) References Cited

U.S. PATENT DOCUMENTS

| 1,733,404 A | 10/1929 | Fahrenwald |
| 1,982,009 A | 11/1934 | McKinney et al. |

(Continued)

FOREIGN PATENT DOCUMENTS

| CN | 1236024 A | 11/1999 |
| CN | 1380446 A | 11/2002 |

(Continued)

OTHER PUBLICATIONS

"Appendix 1: Literature review (Task 1): Literature review concerning the improvement of galvanneal (GA) coating adherence during shear test of adhesively bonded GA steel sheets," 70 pages, no date.

(Continued)

*Primary Examiner* — Brian W Cohen
(74) *Attorney, Agent, or Firm* — Seed IP Law Group LLP (57) ABSTRACT

Described herein are apparatus and methods for the continuous application of nanolaminated materials by electrodeposition.

16 Claims, 1 Drawing Sheet

Related U.S. Application Data division of application No. 14/855,223, filed on Sep. 15, 2015, now abandoned, which is a continuation of application No. PCT/US2014/031101, filed on Mar. 18, 2014.

(60) Provisional application No. 61/802,102, filed on Mar. 15, 2013.

(51) Int. Cl.

| | |
|---|---|
| *C25D 21/10* | (2006.01) |
| *C25D 21/12* | (2006.01) |
| *C25D 5/18* | (2006.01) |
| *C25D 17/00* | (2006.01) |
| *C25D 5/10* | (2006.01) |
| *B82Y 40/00* | (2011.01) |
| *C25D 5/08* | (2006.01) |
| *C25D 17/02* | (2006.01) |
| *C25D 7/04* | (2006.01) |
| *C25D 3/04* | (2006.01) |
| *C25D 3/12* | (2006.01) |
| *C25D 3/20* | (2006.01) |
| *C25D 3/22* | (2006.01) |
| *C25D 3/30* | (2006.01) |
| *C25D 3/34* | (2006.01) |
| *C25D 3/38* | (2006.01) |
| *C25D 3/42* | (2006.01) |
| *C25D 3/44* | (2006.01) |
| *C25D 3/16* | (2006.01) |
| *C25D 3/48* | (2006.01) |
| *C25D 3/54* | (2006.01) |
| *C25D 3/56* | (2006.01) |
| *C25D 5/12* | (2006.01) |
| *C25D 17/06* | (2006.01) |
| *C23C 18/16* | (2006.01) |

(52) U.S. Cl.
CPC .......... *C25D 3/56* (2013.01); *C25D 5/08* (2013.01); *C25D 5/10* (2013.01); *C25D 5/12* (2013.01); *C25D 5/18* (2013.01); *C25D 7/04* (2013.01); *C25D 7/0607* (2013.01); *C25D 7/0614* (2013.01); *C25D 17/00* (2013.01); *C25D 17/007* (2013.01); *C25D 17/02* (2013.01); *C25D 17/06* (2013.01); *C25D 21/10* (2013.01); *C25D 21/12* (2013.01); *C23C 18/1653* (2013.01); *C23C 18/1689* (2013.01)

(56) References Cited

U.S. PATENT DOCUMENTS

| | | |
|---|---|---|
| 2,428,033 A | 9/1947 | Nachtman |
| 2,436,316 A | 2/1948 | Lum et al. |
| 2,470,775 A | 5/1949 | Jenstedt et al. |
| 2,558,090 A | 6/1951 | Jernstedt |
| 2,642,654 A | 6/1953 | Ahrens |
| 2,678,909 A | 5/1954 | Jernstedt et al. |
| 2,694,743 A | 11/1954 | Ruskin et al. |
| 2,706,170 A | 4/1955 | Marchese |
| 2,891,309 A | 6/1959 | Fenster |
| 3,090,733 A | 5/1963 | Brown |
| 3,255,781 A | 6/1966 | Gillespie, Jr. |
| 3,282,810 A | 11/1966 | Odekerken |
| 3,355,374 A | 11/1967 | Brewer et al. |
| 3,359,469 A | 12/1967 | Levy et al. |
| 3,362,851 A | 1/1968 | Dunster |
| 3,483,113 A | 12/1969 | Carter |
| 3,549,505 A | 12/1970 | Hanusa |
| 3,616,286 A | 10/1971 | Aylward et al. |
| 3,633,520 A | 1/1972 | Stiglich, Jr. |
| 3,669,865 A | 6/1972 | Semienko et al. |
| 3,673,073 A | 6/1972 | Tobey et al. |
| 3,716,464 A | 2/1973 | Kovac et al. |
| 3,753,664 A | 8/1973 | Klingenmaier et al. |
| 3,759,799 A | 9/1973 | Reinke |
| 3,787,244 A | 1/1974 | Schulmeister et al. |
| 3,866,289 A | 2/1975 | Brown et al. |
| 3,941,674 A | 5/1976 | Vanmunster |
| 3,994,694 A | 11/1976 | Clauss et al. |
| 3,996,114 A | 12/1976 | Ehrsam |
| 4,053,371 A | 10/1977 | Towsley |
| 4,105,526 A | 8/1978 | Lewellen, Jr. et al. |
| 4,107,003 A | 8/1978 | Anselrode |
| 4,125,447 A | 11/1978 | Bachert |
| 4,191,617 A | 3/1980 | Hurley et al. |
| 4,204,918 A | 5/1980 | McIntyre et al. |
| 4,216,272 A | 8/1980 | Clauss |
| 4,246,057 A | 1/1981 | Janowski et al. |
| 4,269,672 A | 5/1981 | Inoue |
| 4,284,688 A | 8/1981 | Stücheli et al. |
| 4,314,893 A | 2/1982 | Clauss |
| 4,405,427 A | 9/1983 | Byrd |
| 4,422,907 A | 12/1983 | Birkmaier et al. |
| 4,461,680 A | 7/1984 | Lashmore |
| 4,464,232 A | 8/1984 | Wakano et al. |
| 4,510,209 A | 4/1985 | Hada et al. |
| 4,519,878 A | 5/1985 | Hara et al. |
| 4,529,492 A | 7/1985 | Buchholz et al. |
| 4,540,472 A | 9/1985 | Johnson et al. |
| 4,543,300 A | 9/1985 | Hara et al. |
| 4,543,803 A | 10/1985 | Keyasko |
| 4,591,418 A | 5/1986 | Snyder |
| 4,592,808 A | 6/1986 | Doubt |
| 4,597,836 A | 7/1986 | Schaer et al. |
| 4,613,388 A | 9/1986 | Walter et al. |
| 4,620,661 A | 11/1986 | Slatterly |
| 4,652,348 A | 3/1987 | Yahalom et al. |
| 4,666,567 A | 5/1987 | Loch |
| 4,670,356 A | 6/1987 | Sato et al. |
| 4,678,552 A | 7/1987 | Chen |
| 4,678,721 A | 7/1987 | den Broeder et al. |
| 4,702,802 A | 10/1987 | Umino et al. |
| H543 H | 11/1988 | Chen et al. |
| 4,795,735 A | 1/1989 | Liu et al. |
| 4,834,845 A | 5/1989 | Muko et al. |
| 4,839,214 A | 6/1989 | Oda et al. |
| 4,869,971 A | 9/1989 | Nee et al. |
| 4,885,215 A | 12/1989 | Yoshioka et al. |
| 4,904,542 A | 2/1990 | Mroczkowski |
| 4,904,543 A | 2/1990 | Sakakima et al. |
| 4,909,917 A | 3/1990 | Harrison et al. |
| 4,923,574 A | 5/1990 | Cohen |
| 4,975,337 A | 12/1990 | Hyner et al. |
| 4,978,431 A * | 12/1990 | Brannan ............... C25D 5/56 205/137 |
| 5,043,230 A | 8/1991 | Jagannathan et al. |
| 5,045,356 A | 9/1991 | Uemura et al. |
| 5,056,936 A | 10/1991 | Mahrus et al. |
| 5,059,493 A | 10/1991 | Takahata |
| 5,073,237 A | 12/1991 | Bacher et al. |
| 5,079,039 A | 1/1992 | Heraud et al. |
| 5,096,564 A | 3/1992 | Jowitt et al. |
| 5,156,729 A | 10/1992 | Mahrus et al. |
| 5,156,899 A | 10/1992 | Kistrup et al. |
| 5,158,653 A | 10/1992 | Lashmore et al. |
| 5,190,637 A | 3/1993 | Guckel |
| 5,228,967 A | 7/1993 | Crites et al. |
| 5,234,562 A | 8/1993 | Uenishi et al. |
| 5,268,235 A | 12/1993 | Lashmore et al. |
| 5,300,165 A | 4/1994 | Sugikawa |
| 5,320,719 A | 6/1994 | Lasbmore et al. |
| 5,326,454 A | 7/1994 | Engelhaupt |
| 5,352,266 A | 10/1994 | Erb et al. |
| 5,364,523 A | 11/1994 | Tanaka et al. |
| 5,378,583 A | 1/1995 | Guckel et al. |
| 5,413,874 A | 5/1995 | Moysan, III et al. |
| 5,431,800 A | 7/1995 | Kirchhoff et al. |
| 5,461,769 A | 10/1995 | McGregor |
| 5,472,795 A | 12/1995 | Atita |

(56) References Cited

U.S. PATENT DOCUMENTS

| | | |
|---|---|---|
| 5,489,488 A | 2/1996 | Asai et al. |
| 5,500,600 A | 3/1996 | Moyes |
| 5,547,096 A | 4/1996 | Kleyn |
| 5,527,445 A | 6/1996 | Palumbo |
| 5,545,435 A | 8/1996 | Steffier |
| 5,620,800 A | 4/1997 | De Leeuw et al. |
| 5,660,704 A | 8/1997 | Murase |
| 5,679,232 A | 10/1997 | Fedor et al. |
| 5,738,951 A | 4/1998 | Goujard et al. |
| 5,742,471 A | 4/1998 | Barbee, Jr. et al. |
| 5,775,402 A | 7/1998 | Sachs et al. |
| 5,783,259 A | 7/1998 | McDonald |
| 5,798,033 A | 8/1998 | Uemiya et al. |
| 5,800,930 A | 9/1998 | Chen et al. |
| 5,828,526 A | 10/1998 | Kagawa et al. |
| 5,912,069 A | 6/1999 | Yializis et al. |
| 5,930,085 A | 7/1999 | Kitade et al. |
| 5,942,096 A | 8/1999 | Ruzicka et al. |
| 5,952,111 A | 9/1999 | Sugg et al. |
| 5,958,604 A | 9/1999 | Riabkov et al. |
| 6,036,832 A | 3/2000 | Knol et al. |
| 6,036,833 A | 3/2000 | Tang et al. |
| 6,071,398 A | 6/2000 | Martin et al. |
| 6,143,424 A | 11/2000 | Jonte et al. |
| 6,143,430 A | 11/2000 | Miyasaka et al. |
| 6,193,858 B1 | 2/2001 | Hradil et al. |
| 6,200,452 B1 | 3/2001 | Angelini |
| 6,203,936 B1 | 3/2001 | Cisar et al. |
| 6,212,078 B1 | 4/2001 | Hunt et al. |
| 6,214,473 B1 | 4/2001 | Hunt et al. |
| 6,284,357 B1 | 9/2001 | Lackey et al. |
| 6,312,579 B1 | 11/2001 | Bank et al. |
| 6,344,123 B1 | 2/2002 | Bhatnagar |
| 6,355,153 B1 | 3/2002 | Uzoh et al. |
| 6,398,937 B1 | 6/2002 | Menini et al. |
| 6,409,907 B1 | 6/2002 | Braun et al. |
| 6,415,942 B1 | 7/2002 | Fenton et al. |
| 6,461,678 B1 | 10/2002 | Chen et al. |
| 6,466,417 B1 | 10/2002 | Gill |
| 6,468,672 B1 | 10/2002 | Donovan, III et al. |
| 6,482,298 B1 | 11/2002 | Bhatnagar |
| 6,537,683 B1 | 3/2003 | Staschko et al. |
| 6,547,944 B2 | 4/2003 | Schreiber et al. |
| 6,592,739 B1 | 7/2003 | Sonoda et al. |
| 6,725,916 B2 | 4/2004 | Gray et al. |
| 6,739,028 B2 | 5/2004 | Sievenpiper et al. |
| 6,777,831 B2 | 8/2004 | Gutiérrez, Jr. et al. |
| 6,800,121 B2 | 10/2004 | Shahin |
| 6,884,499 B2 | 4/2005 | Penich et al. |
| 6,902,827 B2 | 6/2005 | Kelly et al. |
| 6,908,667 B2 | 6/2005 | Christ et al. |
| 6,923,898 B2 | 8/2005 | Yoshimura et al. |
| 6,979,490 B2 | 12/2005 | Steffier |
| 7,285,202 B2 | 10/2007 | Rumpf |
| 7,581,933 B2 | 9/2009 | Bruce et al. |
| 7,632,590 B2 | 12/2009 | Punsalan et al. |
| 7,736,753 B2 | 6/2010 | Deligianni et al. |
| 8,084,564 B2 | 12/2011 | Kano et al. |
| 8,128,752 B2 | 3/2012 | Kim |
| 8,152,985 B2 | 4/2012 | Macary |
| 8,177,945 B2 | 5/2012 | Arvin et al. |
| 8,192,608 B2 | 6/2012 | Matthews |
| 8,253,035 B2 | 8/2012 | Matsumoto |
| 8,293,077 B2 | 10/2012 | Vacheron |
| 8,585,875 B2 | 11/2013 | Cummings et al. |
| 8,617,456 B1 | 12/2013 | Pechenik et al. |
| 8,814,437 B2 | 8/2014 | Braun |
| 8,871,065 B2 | 10/2014 | Vacheron |
| 8,916,001 B2 | 12/2014 | Pryce Lewis et al. |
| 9,005,420 B2 | 4/2015 | Tomantschger et al. |
| 9,056,405 B2 | 6/2015 | Sato et al. |
| 9,080,692 B2 | 7/2015 | Tomomori et al. |
| 9,108,506 B2 | 8/2015 | Whitaker et al. |
| 9,115,439 B2 | 8/2015 | Whitaker |
| 9,234,294 B2 | 1/2016 | Whitaker et al. |
| 9,273,932 B2 | 3/2016 | Whitaker et al. |
| 9,732,433 B2 | 8/2017 | Caldwell et al. |
| 9,758,891 B2 | 9/2017 | Bao |
| 9,783,907 B2 | 10/2017 | Cai et al. |
| 9,938,629 B2 | 4/2018 | Whitaker et al. |
| 10,041,185 B2 | 8/2018 | Sukenari |
| 10,253,419 B2 | 4/2019 | Lomasney |
| 10,266,957 B2 | 4/2019 | Sugawara et al. |
| 10,472,727 B2 | 11/2019 | Lomasney |
| 10,513,791 B2 | 12/2019 | Lomasney et al. |
| 10,544,510 B2 | 1/2020 | Lomasney |
| 10,662,542 B2 | 5/2020 | Caldwell et al. |
| 10,689,773 B2 | 6/2020 | Whitaker et al. |
| 10,695,797 B2 | 6/2020 | Andreae et al. |
| 10,781,524 B2 | 9/2020 | Whitaker et al. |
| 10,808,322 B2 | 10/2020 | Whitaker et al. |
| 10,844,504 B2 | 11/2020 | Sklar |
| 10,851,464 B1 | 12/2020 | Kobayashi et al. |
| 10,961,635 B2 | 3/2021 | Whitaker |
| 11,118,280 B2 | 9/2021 | Lomasney et al. |
| 11,168,408 B2 | 11/2021 | Sklar |
| 11,180,864 B2 | 11/2021 | Lomasney |
| 11,242,613 B2 | 2/2022 | Lomasney |
| 11,286,575 B2 | 3/2022 | Lomasney et al. |
| 11,293,272 B2 | 4/2022 | Lomasney |
| 11,365,488 B2 | 6/2022 | Morgan et al. |
| 11,519,093 B2 | 12/2022 | Lomasney et al. |
| 11,692,281 B2 * | 7/2023 | Lomasney ............... C25D 5/10 205/103 |
| 2001/0003384 A1 | 6/2001 | Morita |
| 2001/0037944 A1 | 11/2001 | Sanada et al. |
| 2002/0011419 A1 | 1/2002 | Arao et al. |
| 2002/0100858 A1 | 8/2002 | Weber |
| 2002/0179449 A1 | 12/2002 | Domeier et al. |
| 2003/0134142 A1 | 7/2003 | Ivey et al. |
| 2003/0234181 A1 | 12/2003 | Palumbo |
| 2003/0236163 A1 | 12/2003 | Chaturvedi et al. |
| 2004/0027715 A1 | 2/2004 | Hixson-Goldsmith et al. |
| 2004/0031691 A1 | 2/2004 | Kelly et al. |
| 2004/0067314 A1 | 4/2004 | Joshi et al. |
| 2004/0154925 A1 | 8/2004 | Podlaha et al. |
| 2004/0178076 A1 | 9/2004 | Stonas et al. |
| 2004/0211672 A1 | 10/2004 | Ishigami et al. |
| 2004/0232005 A1 | 11/2004 | Hubel |
| 2004/0234683 A1 | 11/2004 | Tanaka et al. |
| 2004/0239836 A1 | 12/2004 | Chase |
| 2005/0002228 A1 | 1/2005 | Dieny et al. |
| 2005/0109433 A1 | 5/2005 | Danger et al. |
| 2005/0205425 A1 | 9/2005 | Palumbo et al. |
| 2005/0221100 A1 | 10/2005 | Kirihara et al. |
| 2005/0279640 A1 | 12/2005 | Shimoyama et al. |
| 2006/0065533 A1 | 3/2006 | Inoue et al. |
| 2006/0135281 A1 | 6/2006 | Palumbo et al. |
| 2006/0135282 A1 | 6/2006 | Palumbo et al. |
| 2006/0201817 A1 | 9/2006 | Guggemos et al. |
| 2006/0243597 A1 | 11/2006 | Matefi-Tempfli et al. |
| 2006/0269770 A1 | 11/2006 | Cox et al. |
| 2006/0272949 A1 | 12/2006 | Detor et al. |
| 2006/0286348 A1 | 12/2006 | Sauer |
| 2007/0158204 A1 | 7/2007 | Taylor et al. |
| 2007/0269648 A1 | 11/2007 | Schuh et al. |
| 2007/0278105 A1 | 12/2007 | Ettel |
| 2008/0063866 A1 | 3/2008 | Allen et al. |
| 2008/0093221 A1 | 4/2008 | Basol |
| 2008/0102360 A1 | 5/2008 | Stimits et al. |
| 2008/0226976 A1 | 9/2008 | Stimits |
| 2008/0245669 A1 | 10/2008 | Yoshioka et al. |
| 2008/0271995 A1 | 11/2008 | Savastiouk et al. |
| 2008/0283236 A1 | 11/2008 | Akers et al. |
| 2009/0004465 A1 | 1/2009 | Kano et al. |
| 2009/0101511 A1 | 4/2009 | Lochtman et al. |
| 2009/0114530 A1 | 5/2009 | Noda et al. |
| 2009/0130424 A1 | 5/2009 | Tholen et al. |
| 2009/0130425 A1 | 5/2009 | Whitaker |
| 2009/0139870 A1 | 6/2009 | Nagai et al. |
| 2009/0155617 A1 | 6/2009 | Kim et al. |
| 2009/0217812 A1 * | 9/2009 | Whitaker ............... C25D 15/02 89/36.02 |
| 2009/0283410 A1 | 11/2009 | Sklar et al. |

(56) References Cited

U.S. PATENT DOCUMENTS

| | | |
|---|---|---|
| 2010/0078330 A1 | 4/2010 | Hyodo |
| 2010/0116675 A1 | 5/2010 | Sklar et al. |
| 2010/0187117 A1 | 7/2010 | Lingenfelter et al. |
| 2010/0304063 A1 | 12/2010 | McCrea et al. |
| 2010/0304179 A1 | 12/2010 | Facchini et al. |
| 2010/0319757 A1 | 12/2010 | Oetting |
| 2011/0111296 A1 | 5/2011 | Berdichevsky et al. |
| 2011/0162970 A1 | 7/2011 | Sato |
| 2011/0180413 A1 | 7/2011 | Whitaker et al. |
| 2011/0186582 A1 | 8/2011 | Whitaker et al. |
| 2011/0256356 A1 | 10/2011 | Tomantschger et al. |
| 2011/0277313 A1 | 11/2011 | Soracco et al. |
| 2012/0088118 A1* | 4/2012 | Lomasney ............ C25D 15/00 205/148 |
| 2012/0118745 A1 | 5/2012 | Bao |
| 2012/0135270 A1 | 5/2012 | Wilbuer et al. |
| 2012/0231574 A1 | 9/2012 | Wang |
| 2012/0282417 A1 | 11/2012 | Garcia et al. |
| 2013/0052343 A1 | 2/2013 | Dieny et al. |
| 2013/0071755 A1 | 3/2013 | Oguro |
| 2013/0075264 A1 | 3/2013 | Cummings et al. |
| 2013/0130057 A1 | 5/2013 | Caldwell et al. |
| 2013/0186852 A1 | 7/2013 | Dietrich et al. |
| 2013/0220831 A1 | 8/2013 | Vidaurre Heiremans et al. |
| 2013/0224008 A1 | 8/2013 | Cheung et al. |
| 2013/0323473 A1 | 12/2013 | Dietsch et al. |
| 2014/0163717 A1 | 6/2014 | Das et al. |
| 2014/0178637 A1 | 6/2014 | Rajagopalan et al. |
| 2014/0231266 A1 | 8/2014 | Sherrer et al. |
| 2015/0322588 A1 | 11/2015 | Lomasney et al. |
| 2016/0002790 A1 | 1/2016 | Whitaker et al. |
| 2016/0002803 A1 | 1/2016 | Sklar |
| 2016/0002806 A1 | 1/2016 | Lomasney |
| 2016/0002813 A1 | 1/2016 | Lomasney |
| 2016/0027425 A1 | 1/2016 | Cook et al. |
| 2016/0047980 A1 | 2/2016 | Page et al. |
| 2016/0145850 A1 | 5/2016 | Cook et al. |
| 2016/0159488 A1 | 6/2016 | Roach et al. |
| 2016/0160863 A1 | 6/2016 | Roach et al. |
| 2016/0214283 A1 | 7/2016 | Schick et al. |
| 2017/0016130 A1 | 1/2017 | Testoni et al. |
| 2017/0191179 A1 | 7/2017 | Sklar |
| 2017/0275775 A1 | 9/2017 | Guadarrama Calderon et al. |
| 2018/0016694 A1 | 1/2018 | Bao |
| 2018/0071980 A1 | 3/2018 | Lomasney et al. |
| 2019/0360116 A1 | 11/2019 | Collinson et al. |
| 2020/0173032 A1 | 6/2020 | Lomasney |
| 2020/0283923 A1 | 9/2020 | Lomasney |
| 2020/0354846 A1 | 11/2020 | Whitaker et al. |
| 2021/0071303 A1 | 3/2021 | Whitaker et al. |
| 2022/0081798 A1 | 3/2022 | Collinson et al. |

FOREIGN PATENT DOCUMENTS

| | | |
|---|---|---|
| CN | 1924110 A | 3/2007 |
| CN | 101113527 A | 1/2008 |
| CN | 101195924 A | 6/2008 |
| CN | 201857434 U | 6/2011 |
| CN | 102148339 A | 8/2011 |
| CN | 203584787 U | 5/2014 |
| CN | 105442011 A | 3/2016 |
| DE | 39 02 057 A1 | 7/1990 |
| DE | 10 2004 006 441 A1 | 12/2005 |
| EP | 1 688 518 A2 | 8/2006 |
| EP | 2 189 554 A1 | 5/2010 |
| JP | S47-2005 A | 2/1972 |
| JP | S47-33925 A | 11/1972 |
| JP | S52-109439 A | 9/1977 |
| JP | 58-197292 A | 11/1983 |
| JP | S60-97774 A | 5/1985 |
| JP | S61-99692 A | 5/1986 |
| JP | H01-132793 A | 5/1989 |
| JP | H02-214618 A | 8/1990 |
| JP | H05-251849 A | 9/1993 |
| JP | H06-196324 A | 7/1994 |
| JP | H07-065347 A | 3/1995 |
| JP | H09-119000 A | 5/1997 |
| JP | 2000-239888 A | 9/2000 |
| JP | 2001-152388 A | 6/2001 |
| JP | 2001-181893 A | 7/2001 |
| JP | 2002-53999 A | 2/2002 |
| JP | 2006-035176 A | 2/2006 |
| JP | 2009-215590 A | 9/2009 |
| KR | 2003-0092463 A | 12/2003 |
| KR | 20-2010-0009670 U | 10/2010 |
| KR | 10-2015-0132043 A | 11/2015 |
| SU | 36121 A1 | 4/1934 |
| WO | 83/02784 A1 | 8/1983 |
| WO | 95/14116 A1 | 5/1995 |
| WO | 2004/001100 A1 | 12/2003 |
| WO | 2007/045466 A1 | 4/2007 |
| WO | 2007/138619 A1 | 12/2007 |
| WO | 2008/057401 A2 | 5/2008 |
| WO | 2009/045433 A1 | 4/2009 |
| WO | 2011/033775 A1 | 3/2011 |
| WO | 2011/110346 A2 | 9/2011 |
| WO | WO-2012012789 A1 * | 1/2012 ............... C25D 1/00 |
| WO | 2012/145750 A2 | 10/2012 |
| WO | 2013/133762 A1 | 9/2013 |
| WO | 2017/097300 A1 | 6/2017 |

OTHER PUBLICATIONS

"Low-temperature iron plating," web blog article found at http:blog.sina.com.cn/s/blog_48ed0a9c0100024z.html, published Mar. 22, 2006, 3 pages. (with English translation).

Adams et al., "Controlling strength and toughness of multilayer films: A new multiscalar approach," *J. Appl. Phys.* 74(2):1015-1021, 1993.

Aizenberg et al., "Skeleton of *Euplectella* sp.: Structural Hierarchy from the Nanoscale to the Macroscale," *Science* 309:275-278, 2005.

Alfantazi et al., "Synthesis of nanocrystalline Zn—Ni alloy coatings," *JMSLD5* 15(15):1361-1363, 1996.

Atanassov et al., "Electrodeposition and properties of nickel-manganese layers," *Surface and Coatings Technology* 78:144-149, 1996.

Bakonyi et al., "Electrodeposited multilayer films with giant magnetoresistance (*GMR*): Progress and problems," *Progress in Materials Science* 55:107-245, 2010.

Bartlett et al., "Electrochemical deposition of macroporous platinum, palladium and cobalt films using polystyrene latex sphere templates," *Chem. Commun.*, pp. 1671-1672, 2000.

Beattie et al., "Comparison of Electrodeposited Copper-Zinc Alloys Prepared Individually and Combinatorially," *J. Electrochem. Soc.* 150(11):C802-C806, 2003.

Bird et al., "Giant Magnetoresistance in Electrodeposited Ni/Cu and Co/Cu Multilayers," *J. Electrochem. Soc.* 142(4):L65-L66, 1995.

Blum, "The Structure and Properties of Alternately Electrodeposited Metals," presented at the Fortieth General Meeting of the American Electrochemical Society, Lake Placid, New York, Oct. 1, 1921, 14 pages.

Cohen et al., "Electroplating of Cyclic Multilayered Alloy (CMA) Coatings," *J. Electrochem. Soc.* 130(10):1987-1995, 1983.

Cowles, "High cycle fatigue in aircraft gas turbines—an industry perspective," *International Journal of Fracture* 80(2-3):147-163, 1996.

"Designing with Metals: Dissimilar Metals and The Galvanic Series," printed Oct. 5, 2017, 3 pages.

Despic et al., "Electrochemical Formation of Laminar Deposits of Controlled Structure and Composition," *J. Electrochem. Soc.* 136(6):1651-1657, 1989.

Dini et al. "On the High Temperature Ductility Properties of Electrodeposited Sulfamate Nickel," *Plating and Surface Finishing* 65(2):36-40, 1978.

Dulal et al., "Characterisation of Co—Ni(Cu)/Cu multilayers deposited from a citrate electrolyte in a flow channel cell," *Electrochimica Acta* 49:2041-2049, 2004.

(56) References Cited

OTHER PUBLICATIONS

Etminanfar et al., "Corrosion resistance of multilayer coatings of nanolayered Cr/Ni electrodeposited from Cr(III)-Ni(II) bath," *Thin Solid Films* 520:5322-5327, 2012.

Gasser et al., "Materials Design for Acoustic Liners: an Example of Tailored Multifunctional Materials," *Advanced Engineering Materials* 6(1-2):97-102, 2004.

Georgescu et al., "Magnetic Behavior of [Ni/Co—Ni—Mg—N] x n Cylindrical Multilayers prepared by Magnetoelectrolysis," *Phys. Stat. Sol. (a)* 189(3):1051-1055, 2002.

Ghanem et al., "A double templated electrodeposition method for the fabrication of arrays of metal nanodots," *Electrochemistry Communications* 6:447-453, 2004.

Grimmett et al., "Pulsed Electrodeposition of Iron-Nickel Alloys," *J. Electrochem. Soc.* 137(11):3414-3418, 1990.

Hariyanti, "Electroplating of Cu—Sn Alloys and Compositionally Modulated Multilayers of Cu—Sn—Zn—Ni Alloys on Mild Steel Substrate," Master of Science Thesis, University of Science, Malaysia, Penang, Malaysia, 2007.

Harris et al., "Improved Single Crystal Superalloys, CMSX-4® (SLS)[La+Y] and CMSX-486®." TMS (*The Minerals, Metals & Materials Society*), Superalloys, p. 45-52, 2004.

Huang et al., "Hardness variation and annealing behavior of a Cr—Ni multilayer electroplated in a trivalent chromium-based bath," *Surface and Coatings Technology* 203:3320-3324, 2009.

Huang et al., "Characterization of Cr—Ni multilayers electroplated from a chromium(III)-nickel(II) bath using pulse current," *Scripta Materialia*, 57:61-64, 2007.

Igawa et al., "Fabrication of SiC fiber reinforced SiC composite by chemical vapor infiltration for excellent mechanical properties," *Journal of Physics and Chemistry of Solids* 66:551-554, 2005.

Ivanov et al., "Corrosion resistance of compositionally modulated multilayered Zn—Ni alloys deposited from a single bath," *Journal of Applied Electrochemistry* 33:239-244, 2003.

Jeong et al., "The Effect of Grain Size on the Wear Properties of Electrodeposited Nanocrystalline Nickel Coatings," *Scripta Mater.* 44:493-499, 2001.

Jia et al., "LIGA and Micromolding" Chapter 4, *The MEMS Handbook*, 2nd edition, CRC Press, Boca Raton, Florida, Edited by Mohamed Gad-el-Hak, 2006.

Kalantary et al., "Compositionally modulated alloy synthesis by electrochemical deposition," *National UK Corrosion Conference of the Institute of Corrosion*, 15th:223-234, Jan. 1, 1995.

Kalantary et al., "The Production of Compositionally Modulated Alloys By Simulated High Speed Electrodeposition From A Single Solution," *Electrochimica Acta* 40(11):1609-1616, 1995.

Kalu et al., "Cyclic voltammetric studies of the effects of time and temperature on the capacitance of electrochemically deposited nickel hydroxide," *Journal of Power Sources* 92:163-167, 2001.

Kaneko et al., "Vickers hardness and deformation of Ni/Cu nano-multilayers electrodeposited on copper substrates," Eleventh International Conference on Intergranular and Interphase Boundaries 2004, *Journal of Material Science* 40:3231-3236, 2005.

Karimpoor et al., "Tensile Properties of Bulk Nanocrystalline Hexagonal Cobalt Electrodeposits," *Materials Science Forum* 386-388:415-420, 2002.

Keckes et al., "Cell-wall recovery after irreversible deformation of wood," *Nature Materials* 2:810- 814, 2003.

Kirilova et al., "Corrosion behaviour of Zn—Co compositionally modulated multilayers electrodeposited from single and dual baths," *Journal of Applied Electrochemistry* 29:1133-1137, 1999.

Kockar et al., "Effect of potantiostatic waveforms on properties of electrodeposited NiFe alloy films," *Eur. Phys. J. B*(42):497-501, 2004.

Kruth et al., "Progress in Additive Manufacturing and Rapid Prototyping" *CIRP Annals* 47(2):525-540, 1998.

Lashmore et al., "Electrodeposited Cu—Ni Textured Superlattices," *J. Electrochem. Soc.* 135(5):1218-1221, 1988.

Lashmore et al., "Electrodeposited Multilayer Metallic Coatings," *Encyclopedia of Materials Science and Engineering, Supp.* vol. 1:136-140, 1988.

Leisner et al., "Methods for electrodepositing composition-modulated alloys," *Journal of Materials Processing Technology* 58:39-44, 1996.

Leith et al., "Characterization of Flow-Induced Compositional Structure in Electrodeposited NiFe Composition-Modulated Alloys" *J. Electrochem. Soc.* 145(8):2827-2833, 1998.

Lekka et al., "Corrosion and wear resistant electrodeposited composite coatings," *Electrochimica Acta* 50:4551-4556, 2005.

Lewis et al., "Stability in thin film multilayers and microlaminates: the role of free energy, structure, and orientation at interfaces and grain boundaries," *Scripta Materialia* 48:1079-1085, 2003.

Low et al., "Electrodeposition of composite coatings containing nanoparticles in a metal deposit," *Surface & Coating Technology* 201:371-383, 2006.

Malone, "New Developments in Electroformed Nickel-Based Structural Alloys," *Plating and Surface Finishing* 74(1):50-56, 1987.

Marchese, "Stress Reduction of Electrodeposited Nickel," *Journal of the Electrochemical Society* 99(2):39-43, 1952.

Meng et al., "Fractography, elastic modulus, and oxidation resistance of Novel metal-intermetallic Ni/Ni$_3$Al multilayer films," *J. Mater. Res.* 17(4):790-796, 2002.

Nabiyouni et al., "Growth, characterization and magnetoresistive study of electrodeposited Ni/Cu and Co—Ni/Cu multilayers," *Journal of Crystal Growth* 275:e1259-e1262, 2005.

Naslain et al., "Synthesis of highly tailored ceramic matrix composites by pressure-pulsed CVI," *Solid State Ionics* 141-142:541-548, 2001.

Naslain, "The design of the fibre-matrix interfacial zone in ceramic matrix composites," *Composites Part A* 29A:1145-1155, 1998.

Nicholls, "Advances in Coating Design for High-Performance Gas Turbines," *MRS Bulletin*, p. 659-670, 2003.

Onoda et al., "Preparation of amorphous/crystalloid soft magnetic multilayer Ni—Co—B alloy films by electrodeposition," *Journal of Magnetism and Magnetic Materials* 126(1-3):595-598, 1993.

Parkin et al., "Oscillations in Exchange Coupling and Magnetoresistance in Metallic Superlattice Structures: Co/Ru, Co/Cr, and Fe/Cr," *Physical Review Letters* 64(19):2304-2307, 1990.

Paz et al., "Nano-Laminated Alloys for Improved Return on Oilfield Assets," Society of Petroleum Engineers, 2016. (14 pages).

Pilone et al., "Model of Multiple Metal Electrodeposition in Porous Electrodes," *Journal of the Electrochemical Society* 153(5):D85-D90, 2006.

Podlaha et al. "Induced Codeposition: I. An Experimental Investigation of Ni-Mo Alloys," *J. Electrochem. Soc.* 143(3):885-892, 1996.

Ross, "Electrodeposited Multilayer Thin Films," *Annual Review of Materials Science* 24:159-188, 1994.

Rousseau et al., "Single-bath Electrodeposition of Chromium-Nickel Compositionally Modulated Multilayers (CMM) From a Trivalent Chromium Bath," *Plating and Surface Finishing*, p. 106-110, 1999.

Saleh et al., "Effects of electroplating on the mechanical properties of stereolithography and laser sintered parts," *Rapid Prototyping Journal* 10(5)305-315, 2004.

Sanders et al., "Mechanics of hollow sphere foams," *Materials Science and Engineering* A347:70-85, 2003.

Sartwell et al., "Replacement of Chromium Electroplating on Gas Turbine Engine Components Using Thermal Spray Coatings," Report No. NRL/MR/6170-05-8890, Naval Research Laboratory, 2005. (207 pages).

Schwartz, "Multiple-Layer Alloy Plating," ASM Handbook 5: Surface Engineering, p. 274-276, 1994.

Sherik, "Synthesis, Structure and Properties of Electrodeposited Bulk Nanocrystalline Nickel," Master's Thesis, Queen's University, Ontario, Canada, 1993.

Shishkovski, "Laser synthesis of functionally graded meso structures and bulk products," FIZMATLIT, Moscow, Russia, pp. 30-38, 2009. (with English Abstract).

(56) References Cited

OTHER PUBLICATIONS

Simunovich et al., "Electrochemically Layered Copper-Nickel Nanocomposites with Enhanced Hardness," *J. Electrochem. Soc.* 141(1):L10-L11, 1994.

Sperling et al., "Correlation of stress state and nanohardness via heat treatment of nickel-aluminide multilayer thin films," *J. Mater. Res.* 19(11):3374-3381, 2004.

Srivastava et al., "Corrosion resistance and microstructure of electrodeposited nickel-cobalt alloy coatings," *Surface & Coatings Technology* 201:3051-3060, 2006.

Stephenson, Jr., "Development and Utilization of a High Strength Alloy for Electroforming," *Plating* 53(2): 183-192, 1966.

Suresh, "Graded Materials for Resistance to Contact Deformation and Damage," *Science* 292:2447-2451, 2001.

Switzer et al., "Electrodeposited Ceramic Superlattices," *Science* 247(4941):444-446, 1990.

Tench et al., "Considerations in Electrodeposition of Compositionally Modulated Alloys," *J. Electrochem. Soc.* 137(10):3061-3066, 1990.

Tench et al., "Enhanced Tensile Strength for Electrodeposited Nickel-Copper Multilayer Composites," *Metallurgical Transactions A* (15A):2039-2040, 1984.

Thangaraj et al., "Corrosion behavior of composition modulated multilayer Zn—Co electrodeposits produced using a single-bath technique," *J. of Appl. Electrochem.* 39:339-345, 2009.

Thangaraj et al., "Surface Modification by Compositionally Modulated Multilayered Zn—Fe Alloy Coatings," *Chinese Journal of Chemistry* 26:2285-2291, 2008.

Tokarz et al., "Preparation, structural and mechanical properties of electrodeposited Co/Cu multilayers," *phys. stat. sol.* (c) 5(11):3526-3529, 2008.

Touchstone Research Laboratory, Ltd., Material Safety Data Sheet, CFOAM Carbon Foams, 2008. (4 pages).

Vill et al., "Mechanical Properties of Tough Multiscalar Microlaminates," *Acta metall. mater.* 43(2):427-437, 1995.

Voevodin et al., "Superhard, functionally gradient, nanolayered and nanocomposite diamond-like carbon coatings for wear protection," *Diamond and Related Materials* 7:463-467, 1998.

Wearmouth et al., "Electroforming with Heat-Resistant, Sulfur-Hardened Nickel," *Plating and Surface Finishing* 66(10):53-57, 1979.

Weil et al., "Pulsed Electrodeposition of Layered Brass Structures," *Metallurgical Transactions A* 19A:1569-1573, 1988.

Weil et al., "Properties of Composite Electrodeposits," U.S. Army Research Office, Final Report, Contract No. DAALO3-87-K-0047, 21 pages, 1990.

Wikipedia, "Gold," URL= http://en.wikipedia.org/wiki/Gold, version modified Nov. 3, 15 pages, 2008.

Wikipedia, "Silver," URL= http://en.wikipedia.org/wiki/Silver, version modified Nov. 3, 12 pages, 2008.

Wilcox, "Surface Modification With Compositionally Modulated Multilayer Coatings," *The Journal of Corrosion Science and Engineering* 6(Paper 52): 2004 (5 pages).

Wu et al., "Preparation and characterization of superhard $CN_x/ZrN$ multilayers," *J. Vac. Sci. Technol. A* 15(3):946-950, 1997.

Yahalom et al., "Formation of composition-modulated alloys by electrodeposition," *Journal of Materials Science* 22:499-503, 1987.

Yang et al., "Effects of SiC sub-layer on mechanical properties of Tyranno-SA/SiC composites with multiple interlayers," *Ceramics International* 31:525-531, 2005.

Yang et al., "Enhanced elastic modulus in composition-modulated gold-nickel and copper-palladium foils," *Journal of Applied Physics* 48(3):876-879, 1977.

Yogesha et al., "Optimization of deposition conditions for development of high corrosion resistant Zn—Fe multilayer coatings," *Journal of Materials Processing Technology* 211:1409-1415, 2011.

Zabludovsky et al., "The Obtaining of Cobalt Multilayers by Programme-controlled Pulse Current," Transactions of the Institute of Metal Finishing 75(5):203-204, 1997.

\* cited by examiner

METHOD AND APPARATUS FOR CONTINUOUSLY APPLYING NANOLAMINATE METAL COATINGS

CROSS-REFERENCE TO RELATED APPLICATIONS

This application is a continuation of Ser. No. 16/909,939 filed on Jun. 23, 2020, which is a divisional of U.S. application Ser. No. 14/855,223, filed Sep. 15, 2015, which is a continuation of International Application No. PCT/US2014/031101, filed Mar. 18, 2014, which claims the benefit of U.S. Provisional Application No. 61/802,102, filed Mar. 15, 2013, each of which is incorporated by reference herein in its entirety.

BACKGROUND

Nanolaminate materials have become widely studied over the past several decades. As a result some desirable advanced performance characteristics of those materials have been discovered and their potential application in numerous fields recognized. While the potential application of nanolaminated materials in numerous areas, including civil infrastructure, automotive, aerospace, electronics, and other areas has been recognized, the materials are on the whole not available in substantial quantities due to the lack of a continuous process for their production.

SUMMARY

Described herein are apparatus and methods for the continuous application of nanolaminated materials by electrodeposition.

DETAILED DESCRIPTION

1.0 Definitions

"Electrolyte" as used herein means an electrolyte bath, plating bath, or electroplating solution from which one or more metals may be electroplated.

"Workpiece" means an elongated conductive material or loop of conductive material.

"Nanolaminate" or "nanolaminated" as used herein refers to materials or coatings that comprise a series of layers less than 1 micron.

All compositions given as percentages are given as percent by weight unless stated otherwise.

2.0 Electrodeposition Apparatus for Continuous Application of Nanolaminated Coatings The continuous application of nanolaminate coatings on conductive materials can be accomplished using an electrodeposition apparatus comprising:
  at least a first electrodeposition cell 1 through which a conductive workpiece 2, which serves as an electrode in the cell, is moved at a rate,
  a rate control mechanism that controls the rate the workpiece is moved through the electrodeposition cell;
  an optional mixer for agitating electrolyte during the electrodeposition process (shown schematically in FIG. 1 as item 3);
  a counter electrode 4; and
  a power supply 8 controlling the current density applied to the workpiece in a time varying manner as it moves through the cell.

Figure 1:
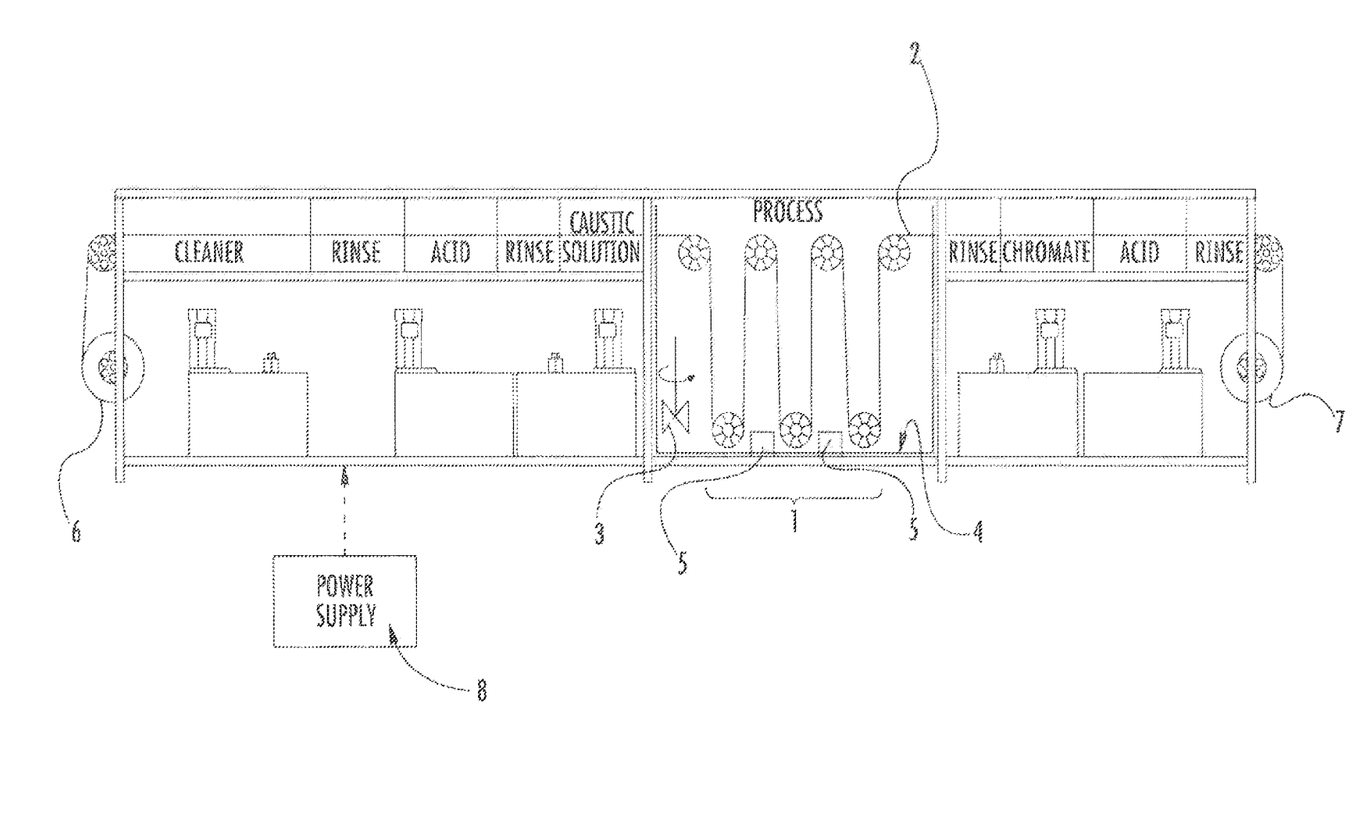
FIG. 1 shows a continuous processing apparatus for the application of nanolaminated coatings configured for conductive materials that can be rolled.

The rate control mechanism (throughput control mechanism) may be integral to one or more drive motors or the conveying system (e.g., rollers, wheels, pulleys, etc., of the apparatus), or housed in associated control equipment; accordingly, it is not shown in FIG. 1. Similarly the counter electrode may have a variety of configurations including, but not limited to, bars, plates, wires, baskets, rods, conformal anodes and the like, and accordingly is shown generically as a plate 4 at the bottom of the electrodeposition cell 1 in FIG. 1. The counter electrode, which functions as an anode except during reverse pulses, may be inert or may be active, in which case the anode will contain the metal species that is to be deposited and will dissolve into solution during operation.

Power supply 8 may control the current density in a variety of ways including applying two or more, three or more or four or more different average current densities to the workpiece as it moves through the electrodeposition cell. In one embodiment the power supply can control the current density in a time varying manner that includes applying an offset current, so that the workpiece remains cathodic when it is moved through the electrodeposition cell and the electrode remains anodic even though the potential between the workpiece and the electrode varies. In another embodiment the power supply varies the current density in a time varying manner which comprises varying one or more of: the maximum current, baseline current, minimum current, frequency, pulse current modulation and reverse pulse current modulation.

The workpiece may be introduced to the electrolyte by immersion in said electrolyte or by spray application of the electrolyte to the workpiece. The application of the electrolyte to the workpiece may be modulated. The rate by which the workpiece is moved through the electrolyte may also be modulated.

Mixing of electrolyte in the electrodeposition cell is provided by solution circulation, a mechanical mixer and/or ultrasonic agitators. While bulk mixing can be provided by the mixer 3, which can be controlled or configured to operate at variable speeds during the electrodeposition process, the apparatus may optionally include one or more ultrasonic agitators which are shown schematically as blocks 5 in the apparatus of FIG. 1. The ultrasonic agitators of the apparatus may be configured to operate independently in a continuous or in a non-continuous fashion (e.g., in a pulsed fashion). In one embodiment the ultrasonic agitators may operate at about 17,000 to 23,000 Hz. In another embodiment they may operate at about 20,000 Hz. Mixing of the electrolyte may also occur in a separate reservoir and the mixed electrolyte may contact the workpiece by immersion or by spray application. Instead of one or more salts of a metal to be electroplated, the electrolyte may comprise two or more, three or more or four or more different salts of electrodepositable metals.

The apparatus may include a location from which the workpiece material is supplied (e.g., a payoff reel) and a location where the coated workpiece is taken up (e.g., a take-up reel, which may be part of a strip puller for conveying a workpiece through the apparatus). Accordingly, the apparatus may comprise a first location 6, from which the workpiece is moved to the electrodeposition cell and/or a second location 7 for receiving the workpiece after it has moved through the electrodeposition cell. Location 6 and location 7 are shown as spindles with reels in FIG. 1, however, they may also consist of racks for storing lengths of materials, folding apparatus, and even enclosures with one or more small openings, from which a workpiece (e.g., a wire, cable, strip or ribbon) is withdrawn or into which a coated workpiece is inserted.

In one embodiment the first and/or second location comprises a spool or a spindle. In such an embodiment the apparatus may be configured to electrodeposit a nanolaminate coating on a continuum of connected parts, wire, rod, sheet or tube that can be wound on the spool or around the spindle.

The apparatus may further comprise an aqueous or a non-aqueous electrolyte. The electrolyte may comprise salts of two or more, three or more or four or more electrodepositable metals.

In addition to the above-mentioned components, the apparatus may comprise one or more locations for treatment of the workpiece prior or subsequent to electrodeposition. In one embodiment the apparatus further includes one or more locations, between the first location and the electrodeposition cell, where the workpiece is contacted with one or more of: a solvent, an acid, a base, an etchant, and/or a rinsing agent to remove the solvent, acid, base, or etchant. In another embodiment the apparatus further includes one or more locations between the electrodeposition cell and a second location, where the coated workpiece is subject to one or more of: cleaning with solvent, cleaning with acid, cleaning with base, passivation treatments and rinsing.

3.0 Electrodeposition Process for the Continuous Application of Nanolaminated Coatings on Workpieces

3.1 Workpieces

Workpieces may take a variety of forms or shapes. Workpieces may be, for example, in the form of wire, rod, tube, or sheet stock (e.g., rolls or folded sheets). Workpieces may be metal or other conductive strip, sheet or wire. Workpieces may also comprise a series of discrete parts that may be, for example, affixed to a sheet or webbing (e.g., metal netting or flexible screen) so as to form a sheet-like assembly that can be introduced into the electrodeposition cell in the same manner as substantially flat sheets that are to be coated with a nanolaminate by electrodeposition. Workpieces which are a series of discrete parts connected to form a strip must be connected by a conductive connector.

Virtually any material may be used as a workpiece, provided it can be rendered conductive and is not negatively affected by the electrolyte. The materials that may be employed as workpieces include, but are not limited to, metal, conductive polymers (e.g., polymers comprising polyaniline or polypyrrole), or non-conductive polymers rendered conductive by inclusion of conductive materials (e.g., metal powders, carbon black, graphene, graphite, carbon nanotubes, carbon nanofibers, or graphite fibers) or electroless application of a metal coating.

3.2 Continuous Electrodeposition of Nanolaminate Coatings

Nanolaminate coatings may be continuously electrodeposited by a method comprising:

moving a workpiece through an apparatus comprising at least a first electrodeposition cell at a rate, where the electrodeposition cell comprises an electrode and an electrolyte comprising salts of one or more metals to be electrodeposited; and controlling the mixing rate and/or the current density applied to the workpiece in a time varying manner as the workpiece moves through the cell, thereby electrodepositing a nanolaminate coating.

By controlling the current density applied to the workpiece in a time varying manner, nanolaminate coatings having layers varying in elemental composition and/or the microstructure of the electrodeposited material can be prepared. In one set of embodiments, controlling the current density in a time varying manner comprises applying two or more, three or more or four or more different current densities to the workpiece as it moves through the electrodeposition cell. In another embodiment, controlling the current density in a time varying manner includes applying an offset current, so that the workpiece remains cathodic when it is moved through the electrodeposition cell and the electrode remains anodic, even though the potential between the workpiece and the electrode varies in time to produce nanolamination. In another embodiment controlling the current density in a time varying manner comprises varying one or more of: the baseline current, pulse current modulation and reverse pulse current modulation.

Nanolaminated coatings may also be formed on the workpiece as it passes through the electrodeposition cell by controlling the mixing rate in a time varying manner. In one embodiment, controlling the mixing rate comprises agitating the electrolyte with a mixer (e.g., impeller or pump) at varying rates. In another embodiment, controlling the mixing rate comprises agitating the electrolyte by operating an ultrasonic agitator in a time varying manner (e.g., continuously, non-continuously, with a varying amplitude over time, or in a series of regular pulses of fixed amplitude). In another embodiment, controlling the mixing rate comprises pulsing a spray application of the electrolyte to the workpiece.

In another embodiment, the nanolaminate coatings may be formed by varying both the current density and the mixing rate simultaneously or alternately in the same electrodeposition process.

Regardless of which parameters are varied to induce nanolaminations in the coating applied to the workpiece as it is moved through the electrodeposition cell, the rate at which the workpiece passes through the cell represents another parameter that can be controlled. In one embodiment rates that can be employed are in a range of about 1 to about 300 feet per minute. In other embodiments, the rates that can be employed are greater than about 1, 5, 10, 30, 50, 100, 150, 200, 250 or 300 feet per minute, or from about 1 to about 30 feet per minute, about 30 to about 100 feet per minute, about 100 to about 200 feet per minute, about 200 to about 300 feet per minute, or more than about 300 feet per minute. Faster rates will alter the time any portion of the workpiece being plated remains in the electrodeposition cell. Accordingly, the rate of mass transfer (rate of electrodeposition) that must be achieved to deposit the same nanolaminate coating thickness varies with the rate the workpiece is moved through the cell. In addition, where processes employ variations in current density to achieve nanolamination, the rate the variation in current density occurs must also be increased with an increasing rate of workpiece movement through the electrodeposition cell.

In one embodiment, the electrodeposition process may further include a step of moving the workpiece from a first location to the electrodeposition cell. In another embodiment, the electrodeposition process may further include a step of moving the workpiece from the electrodeposition cell to a second location for receiving the workpiece after electrodeposition of the nanolaminate coating. As such, the method may further comprise both moving the workpiece from a first location to the electrodeposition cell and moving the workpiece from the electrodeposition cell to the second location.

3.3 Electrolytes and Nanolaminate Coating Compositions and Structures

Continuous electrodeposition of nanolaminate coatings can be conducted from either aqueous or non-aqueous electrolytes comprising salts of the metals to be electrodeposited.

In one embodiment, electrodepositing a nanolaminate coating comprises the electrodeposition of a layered composition comprising one or more, two or more, three or more or four or more different elements independently selected from Ag, Al, Au, Be, Co, Cr, Cu, Fe, Hg, In, Mg, Mn, Mo, Nb, Nd, Ni, P, Pd, Pt, Re, Rh, Sb, Sn, Pb, Ta, Ti, W, V, Zn and Zr, wherein each of said independently selected metals is present at greater than about 0.1, about 0.05, about 0.01, about 0.005 or about 0.001% by weight. In one such embodiment, electrodepositing a nanolaminate coating comprises electrodeposition of a layered composition comprising two or more different elements independently selected from Ag, Al, Au, Be, Co, Cr, Cu, Fe, Hg, In, Mg, Mn, Mo, Nb, Nd, Ni, P, Pd, Pt, Re, Rh, Sb, Sn, Pb, Ta, Ti, W, V, Zn and Zr, wherein each of said independently selected metals is present at greater than about 0.005 or about 0.001% by weight. In another such embodiment, electrodepositing a nanolaminate coating comprises the electrodeposition of layers comprising two or more different metals, where the two or more different metals comprise: Zn and Fe, Zn and Ni, Co and Ni, Ni and Fe, Ni and Cr, Ni and Al, Cu and Zn, Cu and Sn, or a composition comprising Al and Ni and Co (AlNiCo). In any of those embodiments the nanolaminate coating may comprise at least one portion consisting of a plurality of layers, wherein each of said layers has a thickness in a range selected independently from: about 5 nm to about 250 nm, from about 5 nm to about 25 nm, from about 10 nm to about 30 nm, from about 30 nm to about 60 nm, from about 40 nm to about 80 nm, from about 75 nm to about 100 nm, from about 100 nm to about 120 nm, from about 120 nm to about 140 nm, from about 140 nm to about 180 nm, from about 180 nm to about 200 nm, from about 200 nm to about 225 nm, from about 220 nm to about 250 nm, or from about 150 nm to about 250 nm.

In another embodiment, the electrodeposited nanolaminate coating compositions comprise a plurality of first layers and second layers that differ in structure or composition. The first layers and second layers may have discrete or diffuse interfaces at the boundary between the layers. In addition, the first and second layers may be arranged as alternating first and second layers.

In embodiments where the electrodeposited nanolaminate coatings comprise a plurality of alternating first layers and second layers, those layers may comprise two or more, three or more, four or more, six or more, eight or more, ten or more, twenty or more, forty or more, fifty or more, 100 or more, 200 or more, 500 or more, 1,000 or more, 1,500 or more, 2,000 or more, 3,000 or more, 5,000 or more or 8,000 or more alternating first and second layers independently selected for each multilayer coating.

In one embodiment each first layer and each second layer comprises, consists essentially of, or consists of two, three, four or more elements independently selected from: Ag, Al, Au, Be, Co, Cr, Cu, Fe, Hg, In, Mg, Mn, Mo, Nb, Nd, Ni, P, Pd, Pt, Re, Rh, Sb, Sn, Pb, Ta, Ti, W, V, Zn and Zr. In another embodiment, each first layer and each second layer comprises, consists essentially of, or consists of two, three, four or more elements independently selected from: Ag, Al, Au, Co, Cr, Cu, Fe, Mg, Mn, Mo, Ni, P, Sb, Sn, Mn, Pb, Ta, Ti, W, V, and Zn. In another embodiment, each first layer and each second layer comprises, consists essentially of, or consists of two, three, four or more elements independently selected from: Al, Au, Co, Cr, Cu, Fe, Mg, Mn, Mo, Ni, P, Sn, Mn, Ti, W, V, and Zn.

In one embodiment each first layer comprises nickel in a range independently selected from about 1% to about 5%, 5% to about 7%, about 7% to about 10%, about 10% to about 15%, about 15% to about 20%, about 20% to about 30%, about 30% to about 40%, about 40% to about 50%, about 50% to about 55%, about 55% to about 60%, about 60% to about 65%, about 65% to about 70%, about 70% to about 75%, about 75% to about 80%, about 80% to about 85%, about 85% to about 90%, about 90% to about 92%, about 92% to about 93%, about 93% to about 94%, about 94% to about 95%, about 95% to about 96%, about 96% to about 97%, about 97% to about 98% or about 98% to about 99%. In such an embodiment, each second layer may comprise cobalt and/or chromium in a range independently selected from about 1% to about 35%, about 1% to about 3%, about 2% to about 5%, about 5% to about 10%, about 10% to about 15%, about 15% to about 20%, about 20% to about 25%, about 25% to about 30% or about 30% to about 35%.

In one embodiment each first layer comprises nickel in a range independently selected from about 1% to about 5%, about 5% to about 7%, about 7% to about 10%, about 10% to about 15%, about 15% to about 20%, about 20% to about 30%, about 30% to about 40%, about 40% to about 50%, about 50% to about 55%, about 55% to about 60%, about 60% to about 65%, about 65% to about 70%, about 70% to about 75%, about 75% to about 80%, about 80% to about 85%, about 85% to about 90%, about 90% to about 92%, about 92% to about 93%, about 93% to about 94%, about 94% to about 95%, about 95% to about 96%, about 96% to about 97%, about 97% to about 98% or 98% to about 99%, and the balance of the layer comprises cobalt and/or chromium. In such an embodiment, each second layer may comprise cobalt and/or chromium in a range selected independently from about 1% to about 35%, about 1% to about 3%, about 2% to about 5%, about 5% to about 10%, about 10% to about 15%, about 15% to about 20%, about 20% to about 25%, about 25% to about 30% or 30% to about 35%, and the balance of the layer comprises nickel. In such embodiments, first and second layers may additionally comprise aluminum.

In one embodiment each first layer comprises nickel in a range independently selected from about 1% to about 5%, about 5% to about 7%, about 7% to about 10%, about 10% to about 15%, about 15% to about 20%, about 20% to about 30%, about 30% to about 40%, about 40% to about 50%, about 50% to about 55%, about 55% to about 60%, about 60% to about 65%, about 65% to about 70%, about 70% to about 75%, about 75% to about 80%, about 80% to about 85%, about 85% to about 90%, about 90% to about 92%, about 92% to about 93%, about 93% to about 94%, about 94% to about 95%, about 95% to about 96%, about 96% to about 97%, about 97% to about 98% or 98% to about 99%, and the balance of the layer comprises aluminum. In such an embodiment, each second layer may comprise aluminum in a range selected independently from about 1% to about 35%, about 1% to about 3%, about 2% to about 5%, about 5% to about 10%, about 10% to about 15%, about 15% to about 20%, about 20% to about 25%, about 25% to about 30% or 30% to about 35%, and the balance of the layer comprises nickel.

In one embodiment each first layer comprises nickel in a range independently selected from about 1% to about 5%, about 5% to about 7%, about 7% to about 10%, about 10% to about 15%, about 15% to about 20%, about 20% to about 30%, about 30% to about 40%, about 40% to about 50%, about 50% to about 55%, about 55% to about 60%, about 60% to about 65%, about 65% to about 70%, about 70% to about 75%, about 75% to about 80%, about 80% to about 85%, about 85% to about 90%, about 90% to about 92%, about 92% to about 93%, about 93% to about 94%, about 94% to about 95%, about 95% to about 96%, about 96% to about 97%, about 97% to about 98% or 98% to about 99%, and the balance of the layer comprises iron. In such an embodiment, each second layer may comprise iron in a range independently selected from about 1% to about 35%, about 1% to about 3%, about 2% to about 5%, about 5% to about 10%, about 10% to about 15%, about 15% to about 20%, about 20% to about 25%, about 25% to about 30% or 30% to about 35%, and the balance of the layer comprises nickel.

In one embodiment each first layer comprises zinc in a range independently selected from about 1% to about 5%, about 5% to about 7%, about 7% to about 10%, about 10% to about 15%, about 15% to about 20%, about 20% to about 30%, about 30% to about 40%, about 40% to about 50%, about 50% to about 55%, about 55% to about 60%, about 60% to about 65%, about 65% to about 70%, about 70% to about 75%, about 75% to about 80%, about 80% to about 85%, about 85% to about 90%, about 90% to about 92%, about 92% to about 93%, about 93% to about 94%, about 94% to about 95%, about 95% to about 96%, about 96% to about 97%, about 97% to about 98%, about 98% to about 99%, about 99% to about 99.5%, about 99.2% to about 99.7%, about or 99.5% to about 99.99%, and the balance of the layer comprises iron. In such an embodiment, each second layer may comprise iron in a range independently selected from about 0.01% to about 35%, about 0.01% to about 0.5%, about 0.3% to about 0.8%, about 0.5% to about 1.0%, about 1% to about 3%, about 2% to about 5%, about 5% to about 10%, about 10% to about 15%, about 15% to about 20%, about 20% to about 25%, about 25% to about 30% or 30% to about 35%, and the balance of the layer comprises zinc.

In any of the foregoing embodiments the first and/or second layers may each comprise one or more, two or more, three or more, or four or more elements selected independently for each first and second layer from the group consisting of Ag, Al, Au, Be, Co, Cr, Cu, Fe, Hg, In, Mg, Mn, Mo, Nb, Nd, Ni, P, Pd, Pt, Re, Rh, Sb, Sn, Pb, Ta, Ti, W, V, Zn and Zr.

3.4 Pre to About and Post-Electrodeposition Treatments

Prior to electrodeposition, or following electrodeposition, methods of continuously electrodepositing a nanolaminate coating may include further steps of pre-electrodeposition or post-electrodeposition treatment.

Accordingly, the apparatus described above may further comprise one or more locations between the first location and the electrodeposition cell, and the method may further comprise contacting the workpiece with one or more of: a solvent, an acid, a base, an etchant, or a rinsing solution (e.g., water) to remove said solvent, acid, base, or etchant. In addition, the apparatus described above may further comprise one or more locations between the electrodeposition cell and a second location, and the method may further comprise contacting the workpiece with one or more of: a solvent, an acid, a base, a passivation agent, or a rinse solution (e.g., water) to remove the solvent, acid, base or passivation agent.

4.0 Nanolaminated Articles Prepared by Continuous Electrodeposition

The process and apparatus described herein may be adapted for the preparation of articles comprising, consisting essentially of, or consisting of nanolaminated materials by the use of a workpiece to which the coating applied during electrodeposition does not adhere tightly. The article may be obtained after removal of the workpiece from the electrodeposition process by separating the coating from the workpiece. In addition, where the workpiece is not flat, 3-dimensional articles may be formed as reliefs on the contoured surface of the workpiece.

5.0 Certain Embodiments

1. An apparatus for electrodepositing a nanolaminate coating comprising:
   at least a first electrodeposition cell through which a conductive workpiece is moved at a rate,
   a rate control mechanism that controls the rate the workpiece is moved through the electrodeposition cell(s);
   an optional mixer for agitating electrolyte during the electrodeposition process;
   an optional flow control unit for applying the electrolyte to the workpiece;
   an electrode; and
   a power supply controlling the current density applied to the workpiece in a time varying manner as it moves through the cell(s).
2. The apparatus of embodiment 1, wherein controlling the current density in a time varying manner comprises applying two or more, three or more or four or more different current densities to the workpiece as it moves through the electrodeposition cell(s).
3. The apparatus of embodiment 2, wherein controlling the current density in a time varying manner comprises applying an offset current, so that the workpiece remains cathodic when it is moved through the electrodeposition cell(s) and the electrode remains anodic.
4. The apparatus of any of embodiments 1 or 2, wherein the time varying manner comprises one or more of: varying the baseline current, pulse current modulation and reverse pulse current modulation.
5. The apparatus of any of the preceding embodiments, wherein the electrodeposition cell(s) further comprises an ultrasonic agitator.
6. The apparatus of embodiment 5, wherein the ultrasonic agitator operates continuously or in a pulsed fashion.
7. The apparatus of any of the preceding embodiments, wherein the mixer variably mixes an electrolyte placed in the electrodeposition cell(s).

8. The apparatus of any of the preceding embodiments, further comprising a first location, from which the workpiece is moved to the electrodeposition cell(s), and/or a second location, for receiving the workpiece after it has moved through the electrodeposition cell(s).

9. The apparatus of embodiment 8, wherein the first and/or second location comprises a spool or a spindle.

10. The apparatus of embodiment 9 wherein the workpiece is a wire, rod, sheet or tube that can be wound on said spool or around said spindle.

11. The apparatus of any of the preceding embodiments, wherein said electrodeposition cell(s) comprises an aqueous electrolyte.

12. The apparatus of any of embodiments 1-10, wherein said electrodeposition cell comprises a non-aqueous electrolyte(s).

13. The apparatus of any preceding embodiment, wherein said electrolyte comprises salts of two or more, three or more or four or more electrodepositable metals.

14. The apparatus of any of the preceding embodiments further comprising one or more locations between the first location and the electrodeposition cell, where the workpiece is contacted with one or more of: a solvent, an acid, a base, an etchant, and a rinsing agent to remove said solvent, acid, base, or etchant.

15. The apparatus of any of the preceding embodiments further comprising one or more locations between the electrodeposition cell(s) and said second location, where the coated workpiece is subject to one or more of: cleaning with solvent, cleaning with acid, cleaning with base, passivation treatments, and rinsing.

16. A method of electrodepositing a nanolaminate coating comprising:
    moving a workpiece through an apparatus comprising at least a first electrodeposition cell (one, two, three, four, fiver, or more electrodeposition cell(s)) at a rate, where the electrodeposition cell(s) comprises an electrode and an electrolyte comprising salts of two or more, three or more, or four or more different electrodepositable metals; and
    controlling the mixing rate and/or the current density applied to the workpiece in a time varying manner as it moves through the cell(s), thereby electrodepositing a nanolaminate coating.

17. The method of embodiment 16, wherein controlling the current density in a time varying manner comprises applying two or more, three or more or four or more different current densities to the workpiece as it moves through the electrodeposition cell(s).

18. The method of embodiment 16 or 17, wherein controlling the current density in a time varying manner comprises applying an offset current, so that the workpiece remains cathodic when it is moved through the electrodeposition(s) cell and the electrode remains anodic.

19. The method of embodiment 16 or 17, wherein the time varying manner comprises one or more of: varying the baseline current, pulse current modulation and reverse pulse current modulation.

20. The method of any of embodiments 16-19, wherein each electrodeposition cell optionally comprises a mixer, and the method further comprises agitating the electrolyte within any electrodeposition cell with the mixer at a single rate or at varying rates.

21. The method of any of embodiments 16-20, wherein each electrodeposition cell optionally comprises an ultrasonic agitator, and said method further comprises operating the ultrasonic agitator continuously or in a non-continuous fashion to control the mixing rate.

22. The method of any of embodiments 16-21, further comprising controlling the rate the workpiece is moved through the electrodeposition cell(s).

23. The method of any of embodiments 16-22, wherein the apparatus further comprises a first location, from which the workpiece is moved to the electrodeposition cell(s), and/or a second location for receiving the workpiece after it has moved through the electrodeposition cell(s), the method further comprising moving the workpiece from the first location to the electrodeposition cell(s) and/or moving the workpiece from the electrodeposition cell(s) to the second location.

24. The method of embodiment 23, wherein the apparatus further comprises one or more locations between the first location and the electrodeposition cell(s), and the method further comprises contacting the workpiece with one or more of: a solvent, an acid, a base, and an etchant, and rinsing to remove said solvent, acid, base, or etchant at one or more of the locations between the first location and the electrodeposition cell(s).

25. The method of embodiments 23 or 24, wherein the apparatus further comprises one or more locations between the electrodeposition cell(s) and said second location, and the method further comprises contacting the workpiece with one or more of: a solvent, an acid, a base, a passivation agent, and a rinsing agent to remove the solvent, acid base and/or passivation agent at one or more locations between the electrodeposition cell(s) and said second location.

26. The method of any of embodiments 16-25, wherein said workpiece is comprised of a metal, a conductive polymer or a non-conductive polymer rendered conductive by inclusion of conductive materials or electroless application of a metal.

27. The method of any of embodiments 16-26, wherein the workpiece is a wire, rod, sheet or tube.

28. The method of any of embodiments 16-27, wherein the electrolyte(s) is/are aqueous electrolyte(s).

29. The method of any of embodiments 16-27, wherein the electrolyte(s) is/are a non-aqueous electrolyte(s).

30. The method of any of embodiments 16-29, wherein electrodepositing a nanolaminate coating comprises the electrodeposition of a layered composition comprising one or more, two or more, three or more or four or more different elements independently selected from Ag, Al, Au, Be, Co, Cr, Cu, Fe, Hg, In, Mg, Mn, Mo, Nb, Nd, Ni, P, Pd, Pt, Re, Rh, Sb, Sn, Pb, Ta, Ti, W, V, Zn and Zr, wherein each of said independently selected metals is present at greater than 0.1, 0.05, 0.01, 0.005 or 0.001% by weight.

31. The method of any of embodiments 16-29, wherein electrodepositing a nanolaminate coating comprises the electrodeposition of a layered composition comprising two or more different elements independently selected from Ag, Al, Au, Be, Co, Cr, Cu, Fe, Hg, In, Mg, Mn, Mo, Nb, Nd, Ni, P, Pd, Pt, Re, Rh, Sb, Sn, Pb, Ta, Ti, W, V, Zn and Zr, wherein each of said independently selected metals is present at greater than about 0.1, 0.05, 0.01, 0.005 or 0.001% by weight.

32. The method of embodiment 31, wherein said two or more different metals comprise: Zn and Fe, Zn and Ni, Co and Ni, Ni and Fe, Ni and Cr, Ni and Al, Cu and Zn, Cu and Sn or a composition comprising Al and Ni and Co.

33. The method according to any of embodiments 16-32, wherein the nanolaminate coating comprises at least one portion consisting of a plurality of layers, wherein each of said layers has a thickness in a range selected independently from about 5 nm to about 250 nm, from about 5 nm to about 25 nm, from about 10 nm to about 30 nm, from about 30 nm to about 60 nm, from about 40 nm to about 80 nm, from about 75 nm to about 100 nm, from about 100 nm to about 120 nm, from about 120 nm to about 140 nm, from about 140 nm to about 180 nm, from about 180 nm to about 200 nm, from about 200 nm to about 225 nm, from about 220 nm to about 250 nm, or from about 150 nm to about 250 nm.

34. The method of any of embodiments 16-33, wherein the nanolaminate coating composition comprises a plurality of first layers and second layers that differ in structure or composition, and which may have discrete or diffuse interfaces between the first and second layers.

35. The method of embodiment 34 wherein the first and second layers are arranged as alternating first and second layers.

36. The method of embodiment 35, wherein said plurality of alternating first layers and second layers comprises two or more, three or more, four or more, six or more, eight or more, ten or more, twenty or more, forty or more, fifty or more, 100 or more, 200 or more, 500 or more, 1,000 or more, 1,500 or more, 2,000 or more, 4,000 or more, 6,000 or more, or 8,000 or more alternating first and second layers independently selected for each multilayer coating.

37. The method of any of embodiments 34-36, wherein each first layer comprises nickel in a range independently selected from 1%-5%, 5%-7%, 7%-10%, 10%-15%, 15%-20%, 20%-30%, 30%-40%, 40%-50%, 50%-55%, 55%-60%, 60%-65%, 65%-70%, 70%-75%, 75%-80%, 80%-85%, 85%-90%, 90%-92%, 92%-93%, 93%-94%, 94%-95%, 95%-96%, 96%-97%, 97%-98% or 98%-99%.

38. The method of embodiment 37, wherein each second layer comprises cobalt and/or chromium in a range independently selected from 1%-35%, 1%-3%, 2%-5%, 5%-10%, 10%-15%, 15%-20%, 20%-25%, 25%-30% or 30%-35%.

39. The method of any of embodiments 34-36, wherein each first layer comprises nickel in a range independently selected from 1%-5%, 5%-7%, 7%-10%, 10%-15%, 15%-20%, 20%-30%, 30%-40%, 40%-50%, 50%-55%, 55%-60%, 60%-65%, 65%-70%, 70%-75%, 75%-80%, 80%-85%, 85%-90%, 90%-92%, 92%-93%, 93%-94%, 94%-95%, 95%-96%, 96%-97%, 97%-98% or 98%-99%, and the balance of the layer is cobalt and/or chromium.

40. The method of embodiment 39, wherein each second layer comprises cobalt and/or chromium in a range selected independently from 1%-35%, 1%-3%, 2%-5%, 5%-10%, 10%-15%, 15%-20%, 20%-25%, 25%-30% or 30%-35%, and the balance of the layer is nickel.

41. The method of any of embodiments 34-36, wherein each first layer comprises nickel in a range independently selected from 1%-5%, 5%-7%, 7%-10%, 10%-15%, 15%-20%, 20%-30%, 30%-40%, 40%-50%, 50%-55%, 55%-60%, 60%-65%, 65%-70%, 70%-75%, 75%-80%, 80%-85%, 85%-90%, 90%-92%, 92%-93%, 93%-94%, 94%-95%, 95%-96%, 96%-97%, 97%-98% or 98%-99%, and the balance of the layer comprises iron.

42. The method of embodiment 41, wherein each second layer comprises iron in a range independently selected from 1%-35%, 1%-3%, 2%-5%, 5%-10%, 10%-15%, 15%-20%, 20%-25%, 25%-30% or 30%-35%, and the balance of the layer comprises nickel.

43. The method of any of embodiments 34-36, wherein each first layer comprises zinc in a range independently selected from 1%-5%, 5%-7%, 7%-10%, 10%-15%, 15%-20%, 20%-30%, 30%-40%, 40%-50%, 50%-55%, 55%-60%, 60%-65%, 65%-70%, 70%-75%, 75%-80%, 80%-85%, 85%-90%, 90%-92%, 92%-93%, 93%-94%, 94%-95%, 95%-96%, 96%-97%, 97%-98%, 98%-99%, 99%-99.5%, 99.2%-99.7%, or 99.5%-99.99%, and the balance of the layer comprises iron.

44. The method of embodiment 43, wherein each second layer comprises iron in a range independently selected from 0.01%-35%, 0.01%-0.5%, 0.3%-0.8%, 0.5%-1.0%, 1%-3%, 2%-5%, 5%-10%, 10%-15%, 15%-20%, 20%-25%, 25%-30% or 30%-35%, and the balance of the layer comprises zinc.

45. The method of any of embodiments 34-36, wherein one or more of said first and/or second layers comprises one or more, two or more, three or more or four or more elements selected independently for each first and second layer from the group consisting of Ag, Al, Au, C, Cr, Cu, Fe, Mg, Mn, Mo, Sb, Si, Sn, Pb, Ta, Ti, W, V, Zn and Zr.

46. A product produced by the method of any of embodiments 16-44.

The invention claimed is:

1. An apparatus for electrodepositing a nanolaminate coating, comprising:
   an electrodeposition cell for use with a conductive workpiece, the electrodeposition cell being configured for movement of the conductive workpiece therethrough at a rate;
   an electrolyte in the electrodeposition cell, the electrolyte comprising salts of two or more electrodepositable metals;
   a rate control mechanism operable to control the rate at which the conductive workpiece moves through the electrodeposition cell;
   an electrode; and
   a power supply configured to control a current density applied to the conductive workpiece in a time varying manner as it moves through the electrodeposition cell, wherein controlling the current density in a time varying manner comprises repeatedly applying three or more different current densities to the conductive workpiece as it moves through the electrodeposition cell, the power supply further configured to apply an offset current to the conductive workpiece so that the conductive workpiece remains cathodic when it is moved through the electrodeposition cell and the electrode remains anodic.

2. The apparatus of claim 1, wherein the time varying manner comprises one or more of: varying a offset current, a pulse current modulation and a reverse pulse current modulation.

3. The apparatus of claim 1, wherein the electrodeposition cell further comprises an ultrasonic agitator.

4. The apparatus of claim 3, wherein the ultrasonic agitator operates continuously or in a pulsed fashion.

5. The apparatus of claim 1, further comprising a first location, from which the conductive workpiece is moved to the electrodeposition cell, and/or a second location, for receiving the conductive workpiece after it has moved through the electrodeposition cell.

6. The apparatus of claim 5, wherein the first location, the second location, or both comprises a spool or a spindle.

7. The apparatus of claim 6, wherein the conductive workpiece is a wire, rod, sheet or tube that can be wound on the spool or around the spindle.

8. The apparatus of claim 1, wherein the electrolyte is an aqueous electrolyte.

9. The apparatus of claim 1, wherein the electrolyte is a non-aqueous electrolyte.

10. The apparatus of claim 1, wherein said electrolyte comprises salts of three or more electrodepositable metals.

11. The apparatus of claim 5, further comprising one or more locations between the first location and the electrodeposition cell, where the conductive workpiece is contacted with one or more of: a solvent, an acid, a base, an etchant, and a rinsing agent to remove said solvent, acid, base, or etchant.

12. The apparatus of claim 5, further comprising one or more locations between the electrodeposition cell and the second location, where the conductive workpiece is subject to one or more of: cleaning with solvent, cleaning with acid, cleaning with base, passivation treatments, and rinsing.

13. The apparatus of claim 1, further comprising a mixer for agitating the electrolyte.

14. The apparatus of claim 13, wherein the mixer variably mixes the electrolyte placed in the electrodeposition cell.

15. The apparatus of claim 1, further comprising a flow control unit for applying the electrolyte to the conductive workpiece.

16. The apparatus of claim 1, further comprising a plurality of rotating elements in the electrodeposition cell, the plurality of rotating elements being arranged such that the conductive workpiece travels in a serpentine path guided by the plurality of rotating elements.

\* \* \* \* \*